(12) United States Patent
Lentner et al.

(10) Patent No.: US 8,170,174 B1
(45) Date of Patent: May 1, 2012

(54) SIMPLIFIED JET PUMP RISER BRACE CLAMP

(75) Inventors: Bruce J. Lentner, Wilmington, NC (US); Michael S. DeFilippis, Wilmington, NC (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 637 days.

(21) Appl. No.: 12/482,519

(22) Filed: Jun. 11, 2009

(51) Int. Cl.
*G21C 15/00* (2006.01)

(52) U.S. Cl. .......................... 376/372; 376/461; 403/261

(58) Field of Classification Search .................. 376/372, 376/461; 403/261
See application file for complete search history.

(56) References Cited

U.S. PATENT DOCUMENTS

| | | | |
|---|---|---|---|
| 1,814,231 A * | 7/1931 | Stone | 182/53 |
| 3,179,212 A * | 4/1965 | Gostling | 52/646 |
| 5,485,655 A * | 1/1996 | Wang | 16/371 |
| 5,810,503 A * | 9/1998 | Schlanger | 403/261 |
| 6,053,652 A | 4/2000 | Deaver et al. | |
| 6,086,120 A | 7/2000 | Deaver et al. | |
| 6,108,391 A | 8/2000 | Deaver | |
| 6,450,774 B1 | 9/2002 | Erbes et al. | |
| 6,463,114 B1 | 10/2002 | Wivagg | |
| 6,490,331 B2 | 12/2002 | Erbes | |
| 6,647,083 B1 | 11/2003 | Jensen | |
| 7,185,798 B2 | 3/2007 | Butler | |

FOREIGN PATENT DOCUMENTS

SU 403383 * 2/1974

* cited by examiner

*Primary Examiner* — Ricardo Palabrica
(74) *Attorney, Agent, or Firm* — Ryan Alley Intellectual Property Law

(57) ABSTRACT

An embodiment of the present invention takes the form of an apparatus or system that may reduce the level of vibration experienced by an inlet riser or other similar object within a reactor pressure vessel. An embodiment of the present invention may eliminate the need for welding the riser brace to the inlet riser. An embodiment of the present invention provides at least one riser brace clamp that generally clamps the riser brace to the inlet riser. After installation, the riser brace clamp may lower the amplitude of, and/or change the frequency of, the vibration experienced by the inlet riser.

20 Claims, 5 Drawing Sheets

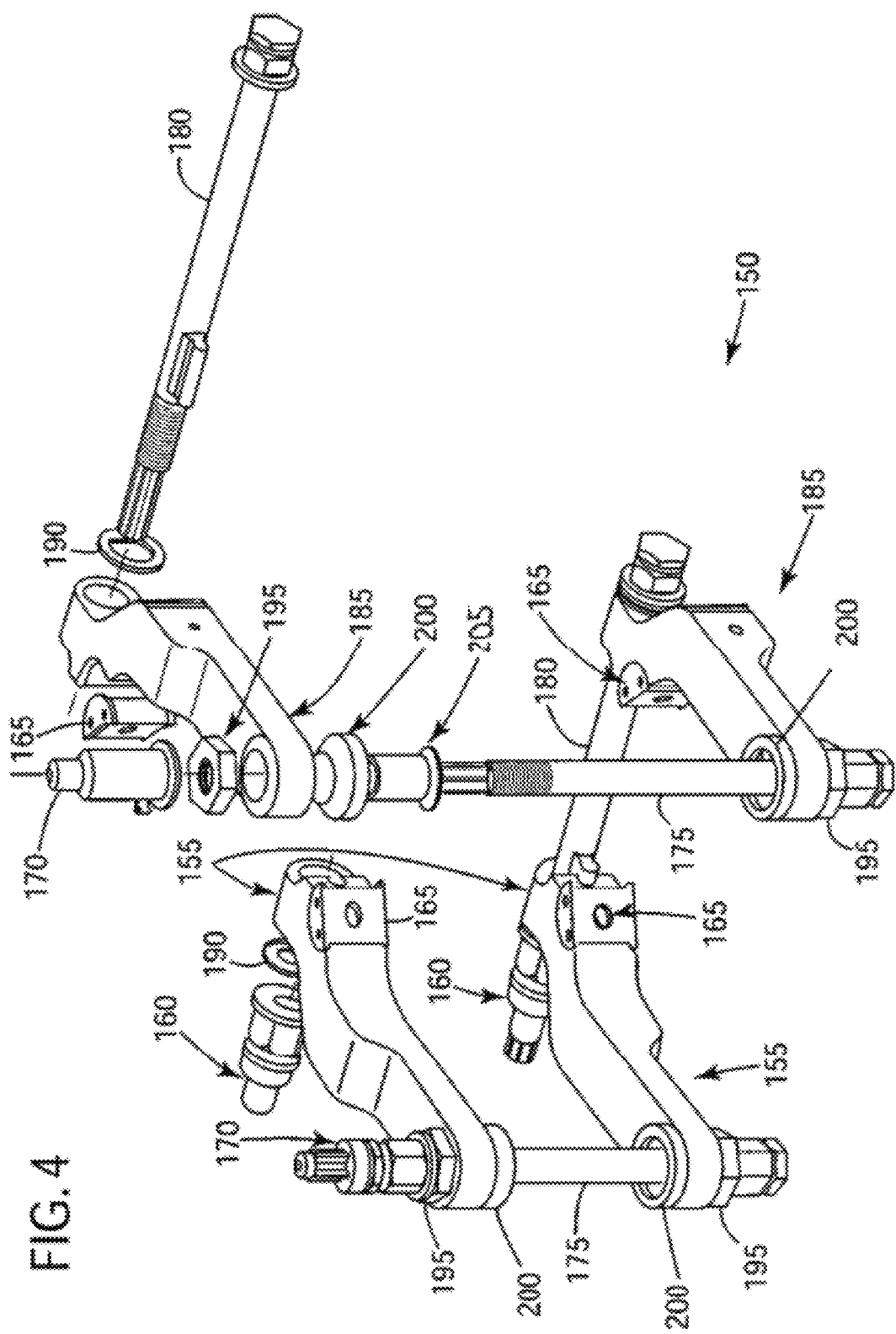

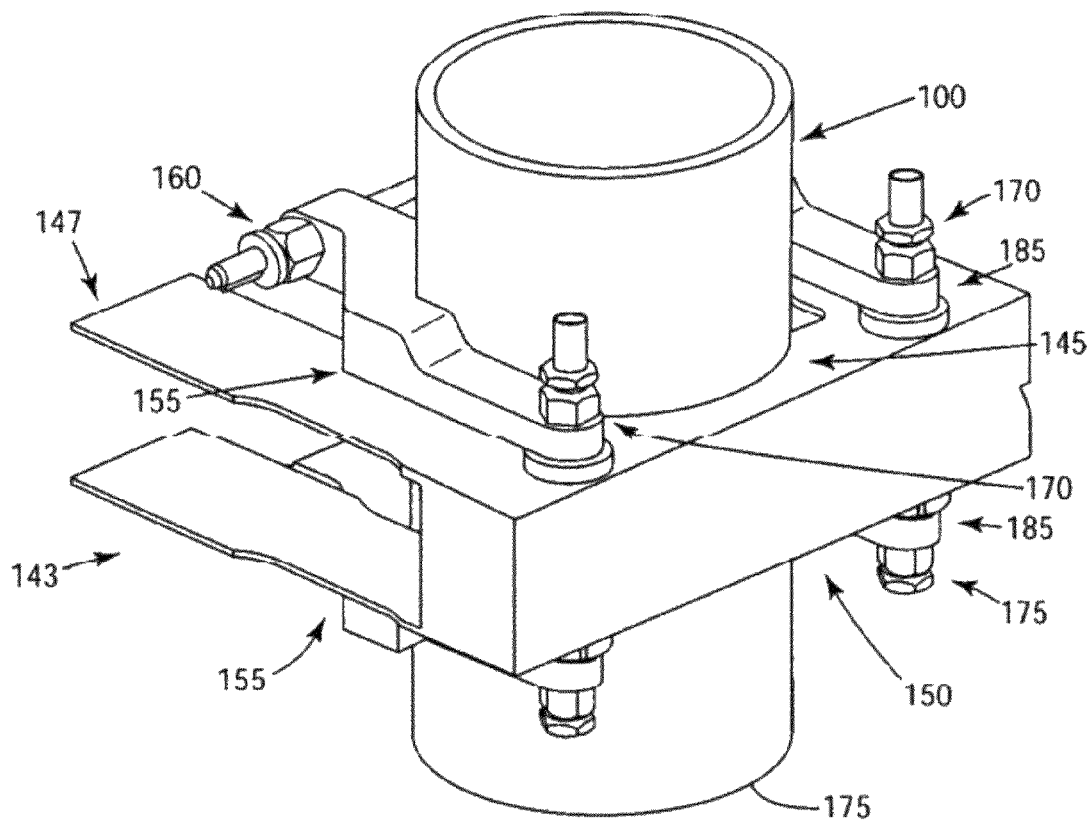

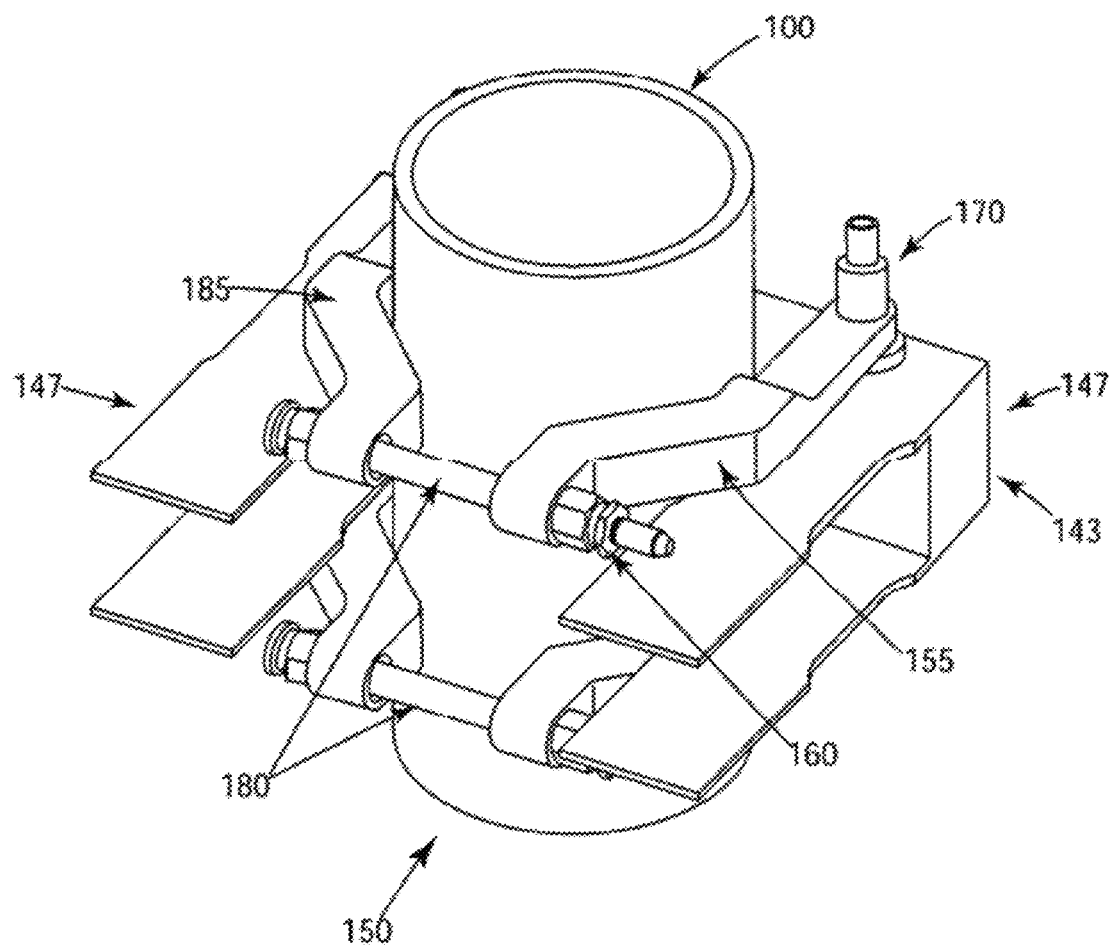

SIMPLIFIED JET PUMP RISER BRACE CLAMP

BACKGROUND OF THE INVENTION

The present invention relates generally to the welds between that connect some components of a nuclear reactor pressure vessel; and more particularly to an apparatus and system for replacing the welds between those components.

A non-limiting example of a nuclear reactor, a conventional boiling water reactor (BWR) is shown in FIGS. 1-3. A typical BWR includes: a reactor pressure vessel (RPV) 10, a core shroud 30 disposed within the RPV 10, and a nuclear fuel core 35. The core shroud 30 is a cylinder that surrounds the nuclear fuel core 35, which includes a plurality of fuel bundle assemblies 40 disposed within the core shroud 30. A top guide 45 and a core plate 50 supports each of the fuel bundle assemblies 40.

An annular region between the core shroud 30 and the RPV 10 is considered the downcomer annulus 25. Coolant water flows through the downcomer annulus 25 and into the core lower plenum 55. Feedwater enters the RPV 10 via a feedwater inlet 15 and is distributed circumferentially within the RPV 10 by a feedwater sparger 20, which is adjacent a core spray line 105. Then, the water in the core lower plenum 55 flows upward through the nuclear fuel core 35. In particular, water enters the fuel bundle assemblies 40, wherein a boiling boundary layer is established. A mixture of water and steam exits the nuclear fuel core 35 and enters the core upper plenum 60 under the shroud head 65. The steam-water mixture then flows through standpipes 70 on top of the shroud head 65 and enters the steam separators 75, which separate water from steam. The separated water is recirculated to the downcomer annulus 25 and the steam flows exits the RPV 10 via a nozzle 110 for use in generating electricity and/or in another process.

As illustrated in FIG. 1, a conventional jet pump assembly 85 comprises a pair of inlet mixers 95. Each inlet mixer 95 has an elbow welded thereto, which receives pressurized driving water from a recirculation pump (not illustrated) via an inlet riser 100. Some inlet mixers 95 comprise a set of five nozzles circumferentially distributed at equal angles about an axis of the inlet mixer 95. Here, each nozzle is tapered radially and inwardly at the nozzle outlet. This convergent nozzle energizes the jet pump assembly 85. A secondary inlet opening (not illustrated) is located radially outside of the nozzle exit. Therefore, as jets of water exit the nozzles, water from the downcomer annulus 25 is drawn into the inlet mixer 95 via the secondary inlet opening, where mixing with water from the recirculation pump occurs.

The BWR also includes a coolant recirculation system, which provides the forced convection flow through the nuclear fuel core 35 necessary to attain the required power density. A portion of the water is drawn from the lower end of the downcomer annulus 25 via a recirculation water outlet 80 and forced by the recirculation pump into a plurality of jet pump assemblies 85 via recirculation water inlets 90. The jet pump assemblies 85 are typically circumferentially distributed around the core shroud 30 and provide the required reactor core flow. A typical BWR has between sixteen to twenty-four inlet mixers 95.

Typically, each jet pump assembly 85 includes at least the following. A transition piece 120, a riser pipe 130 extending downwardly from the transition piece 120 to an riser elbow 135. The riser elbow 135 connects the riser pipe 130 to a recirculation inlet 90 along a wall of the RPV 10. A pair of inlet mixers 95 extends downwardly from the transition piece 120 to a pair of diffusers 115 mounted over holes in a pump deck 125. The pump deck 125 connects a bottom portion of the core shroud 30 with the RPV 10. The riser pipe 130 is typically tubular and is oriented vertically within the downcomer annulus 25, in parallel relation to the wall of the core shroud 30. The riser elbow 135 is typically tubular and bends outwardly toward the recirculation inlet 90. The transition piece 120 extends in opposite lateral directions at the top of the riser pipe 130 to connect with the inlet mixers 95 on opposite sides of the riser pipe 130. The inlet mixers 95 are oriented vertically in the downcomer annulus 25 in parallel relation to the riser pipe 130. Restrainer brackets 140, located between the inlet mixers 95 and the riser pipe 130, provide lateral support for the inlet mixers 95.

Typically, the riser pipe 130 is supported and stabilized within the RPV 10 by a riser brace 143 (illustrated, for example, in FIG. 2) attached to the riser pipe 130 and to an attachment wall 149, which is typically a wall of the RPV 10. Commonly, the riser brace 143 is attached to the riser pipe 130 and to the attachment wall 149 by welding. The riser brace 143 ordinarily comprises a yoke 145 and side members 147 extending respectively from opposite ends of the yoke 145 in a spaced parallel relation. Typically, the yoke 145 has an inwardly curved surface between the side members 147, which is complementary to the outer curvature of the exterior surface of the riser pipe 130.

The riser brace 143 is disposed in the downcomer annulus 25 with the riser pipe 130 disposed between the side members 147. The riser brace 143 is normally attached to the riser pipe 130 via a weld between the inwardly curved surface and the exterior surface of the riser pipe 130. Here, the side members 147 generally transverse to the riser pipe 130 and extend from the yoke 145 and respective ends of the side members 147 attach to the attachment wall 149. The ends of the side members 147 are normally welded to the attachment wall 149. Alternatively, the ends of the side members 147 may be welded to an intermediary structure, such as, but not limiting of, braces, blocks or pads, with the intermediary structure being in turn welded to the attachment wall 149. Typically, each side member 147 comprises an upper leg and a lower leg disposed beneath the upper leg in spaced parallel relation therewith. The riser brace 143 generally provides lateral and radial support to the riser pipe 130. In addition, the riser brace 143 is designed to accommodate the differential thermal expansion resulting from RPV 10 operation, and to accommodate for flow-induced vibrations associated with the reactor water circulation system.

Intergranular stress corrosion cracking (IGSCC) resulting from corrosion, radiation and/or stress may occur in the welds between the riser braces 143 and the riser pipes 130 of jet pump assemblies 85 of an RPV 10. Cracks initiated by IGSCC or other causes in the welds between the riser braces 143 and the riser pipes 130 may grow to critical sizes for mechanical fatigue resulting from the vane passing frequencies of the recirculation pumps exceeding the excitation frequency of the riser braces 143. To avoid resonance, the natural frequency of the riser brace 143 should not be nearly equal to the vane passing frequency of the recirculation pumps (at any pump speed). If the vane passing frequency of the recirculation pumps equals or exceeds the natural frequency of the riser brace 143, then the riser brace 143 may potentially enter resonance; possibly to the detriment of the jet pump assembly 85.

A clamp apparatus for mechanically reinforcing the weld between a riser pipe and a riser brace is disclosed in U.S. Pat. No. 7,185,798 B2 to Butler. Here, the clamp apparatus augments the welded connection between the riser brace and the riser pipe. A clamp apparatus for stiffening a riser brace of a jet pump assembly 85 is disclosed in U.S. Pat. No. 6,647,083 B1 to Jensen. Here, the clamp apparatus is applied to the side members of the riser brace to shorten portions of the side members subject to vibration. The clamp apparatus does not attach to the riser pipe and does not augment the welded connection between the riser brace and the riser pipe.

Various clamps used in jet pump assemblies of boiling water reactors are represented by U.S. Pat. Nos. 6,463,114 B1 to Wivagg, 6,490,331 B2 to Erbes, 6,450,774 B1 to Erbes et al, 6,086,120 and 6,053,652 to Deaver et al, and 6,108,391 to Deaver. The Wivagg patent discloses a clamp used in conjunction with a jacking device to restrain the existing jack screws that are welded about the peripheries of the inlet mixers to provide lateral restraint for the inlet mixers within the restrainer brackets. The Erbes ('331) patent relates to a spring clamp for providing a tight fit between an inlet mixer 95 and a restrainer bracket. The Erbes et al ('120) patent discloses a clamp for being installed on a slip joint coupling an inlet mixer to a diffuser. The clamp is used to squeeze the diffuser to impart an oval deformation to the diffuser. The Deaver et al patents ('120 and '652) disclose a clamp apparatus for supporting the lower portion of a riser of a jet pump assembly. The clamp apparatus comprises an elbow clamp, a riser clamp and a bridge coupling the elbow and riser clamps. The riser clamp includes a pair of legs for being disposed on opposite sides of the riser pipe and a hack portion rigidly connecting the legs in fixed relation. The Deaver ('391) patent relates to a clamp having upper and lower clamp elements receiving the outer end of a riser elbow between the upper and lower clamp.

There are a few possible problems with the currently known apparatuses, methods, and systems for dampening the vibration experience by the riser pipe 130. Currently known solutions involve re-welding or integrating with existing welds, which may lead to a repeat failure. These also generally require longer installation time and expose operators to longer period of radioactivity.

Based on the above discussion, operators of nuclear power plants may desire an apparatus and system for reinforcing the connection between a riser pipe 130 and a riser brace 143 of a jet pump assembly 85. The apparatus and system should not require welds between the riser pipe 130 and the riser brace 143. The apparatus and system should reduce a level of vibration experienced by the riser pip 130.

BRIEF DESCRIPTION OF THE INVENTION

In accordance with an embodiment of the present invention, an apparatus for integrating a riser brace with an inlet riser of a jet pump assembly, wherein the inlet riser comprises a central longitudinal axis and the riser brace comprises first and second side members extending from a yoke which engages a portion of the inlet riser, and wherein the first and second side members extend transversely to the central longitudinal axis on opposite sides of the inlet riser, the apparatus comprising: a) a first and a second upper clamp arm mountable on a top surface of the riser brace, wherein a side surface of the first upper clamp arm is positioned on opposite a side surface of the second upper clamp arm, and wherein the side surfaces of the first and the second upper clamp arms engage an outer surface of the inlet riser; b) a first and a second lower clamp arm mountable on a bottom surface of the riser brace, wherein a side surface of the first lower clamp arm is positioned on opposite a side surface of the second lower clamp arm, and wherein the side surfaces of the first and the second lower clamp arms engage an outer surface of the inlet riser; c) an upper and a lower pinch bolt assembly for horizontally connecting the upper and the lower clamp arms; wherein the upper pinch bolt assembly connects the first upper clamp arm with the second upper clamp arm; and wherein the lower pinch bolt assembly connects the first lower clamp arm with the second lower clamp am; and d) a first and a second hinge bolt assembly for vertically connecting the upper and lower clamp arms, wherein the riser brace is positioned between the upper and lower clamp arms after the first and second hinge bolt assemblies vertically connect the upper and lower clamp arms; wherein operation of the pinch bolt assemblies and the hinge bolt assemblies secure the inlet riser to the riser brace allowing for a reduction in a level of vibration experienced by the inlet riser.

In accordance with another embodiment of the present invention, a system for dampening a level of vibration experienced by an object integrated with a structure within a reactor pressure vessel (RPV) of a nuclear power plant; wherein the system comprises: a) a riser brace for dampening a level of vibration experienced by an inlet riser of a jet pump assembly of the RPV, wherein the inlet riser comprises a central longitudinal axis and the riser brace comprises first and second side members extending from a yoke; wherein the yoke engages an outer diameter of the inlet riser, and wherein the first and second side members extend transversely on opposite sides of the inlet riser; b) first and second upper clamp arms mountable on an upper surface of the riser brace, wherein a side surface of the first upper clamp arm faces opposite a side surface of the second upper clamp arm, and wherein each side surface of the first and the second upper clamp arms engage and partially surrounded the outer diameter of the inlet riser; c) first and second lower clamp arms mountable on a lower surface of the riser brace, wherein a side surface of the first lower clamp arm faces opposite a side surface of the second lower clamp arm, and wherein the side surfaces of the first and the second lower clamp arms engage and partially surrounded the outer diameter of the inlet riser; d) upper and lower pinch bolt assemblies for horizontally connecting the upper and the lower clamp arms; wherein the upper pinch bolt assembly connects the first upper clamp arm with the second upper clamp arm; and wherein the lower pinch bolt assembly connects the first lower clamp arm with the second lower clamp arm; and first and second hinge bolt assemblies for vertically connecting the upper and lower clamp arms, wherein the riser brace is rests between the upper and lower clamp arms; wherein operation of the pinch bolt assemblies and the hinge bolt assemblies secures the inlet riser to the riser brace.

BRIEF DESCRIPTION OF THE DRAWING

FIG. 4 is a schematic illustrating a partially exploded isometric view of an embodiment of a riser brace clamp, in accordance with an embodiment of the present invention.

FIGS. 5A and 5B, collectively FIG. 5, is a schematic illustrating a plan view of a riser brace clamp installed on an inlet riser, in accordance with an embodiment of the present invention.

DETAILED DESCRIPTION OF THE INVENTION

Certain terminology may be used herein for convenience only and is not to be taken as a limitation on the invention. For example, words such as "upper", "lower", "left", "front", "right", "horizontal", "vertical", "upstream", "downstream", "fore", and "aft" merely describe the configuration shown in the FIGS. Indeed, the components may be oriented in any direction and the terminology, therefore, should be understood as encompassing such variations unless specified otherwise.

As used herein, an element or step recited in the singular and preceded with "a" or "an" should be understood as not excluding plural elements or steps, unless such exclusion is explicitly recited. Furthermore, references to "an embodiment" of the present invention are not intended to exclude additional embodiments incorporating the recited features.

The following discussion focuses on an embodiment of the present invention integrated with the jet pump assemblies 85 of the RPV 10. Other embodiments of the present invention may be integrated with other systems that require a dampening of and/or frequency change in vibration.

The present invention takes the form of an apparatus or system that may reduce the level of vibration experienced by an inlet riser 100 or other similar object within a RPV 10. An embodiment of the present invention may eliminate the need for welding the riser brace 143 to the inlet riser 100. An embodiment of the present invention provides at least one riser brace clamp 150 that generally clamps the riser brace 143 to the inlet riser 100. After installation, the riser brace clamp 150 may lower the amplitude of, and/or change the frequency of, the vibration experienced by the inlet riser 100.

Figure 1:
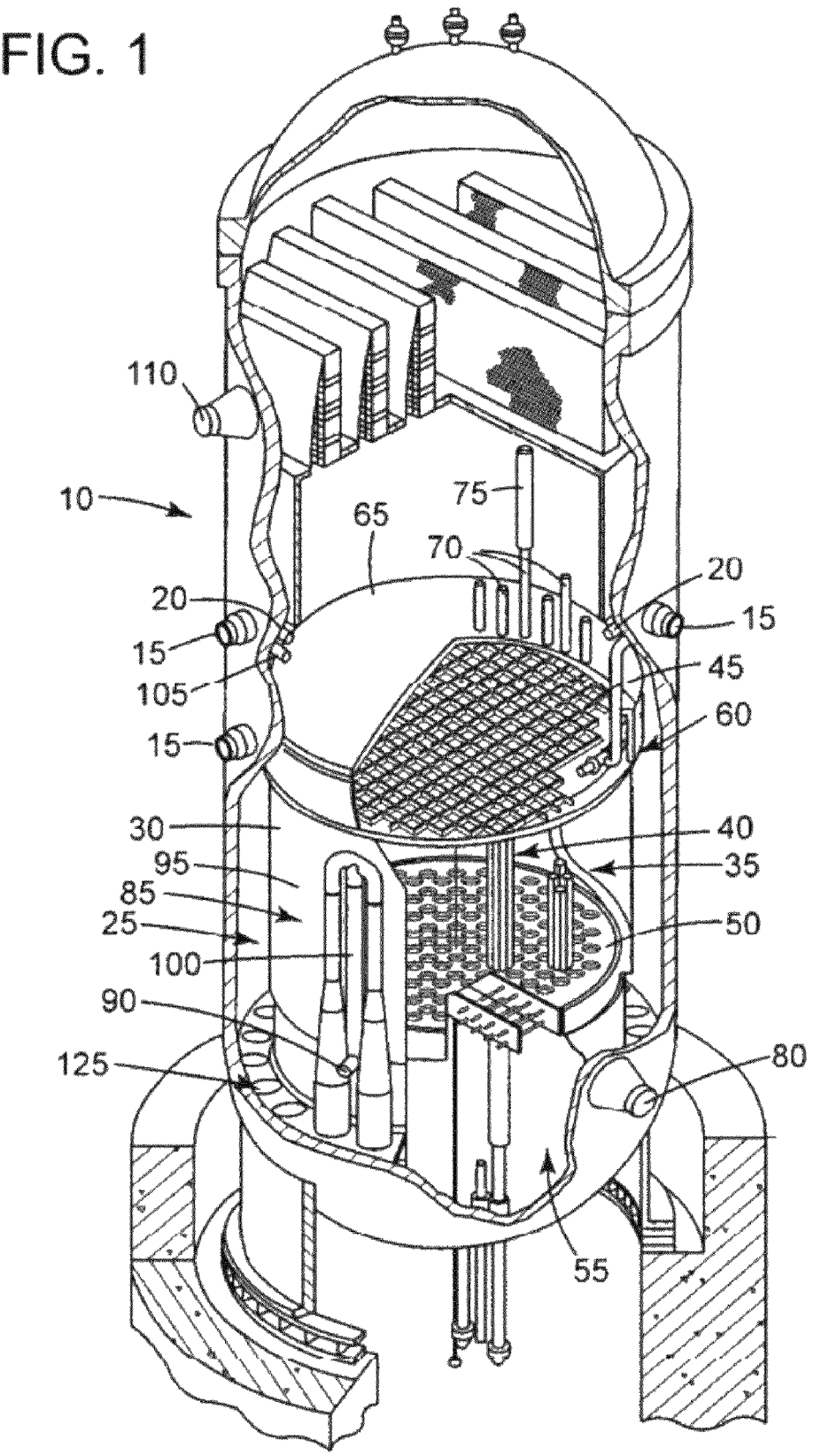
FIG. 1 is a schematic, illustrating a boiling water reactor partially in cross-section, within which an embodiment of the present invention operates.
Figure 2:
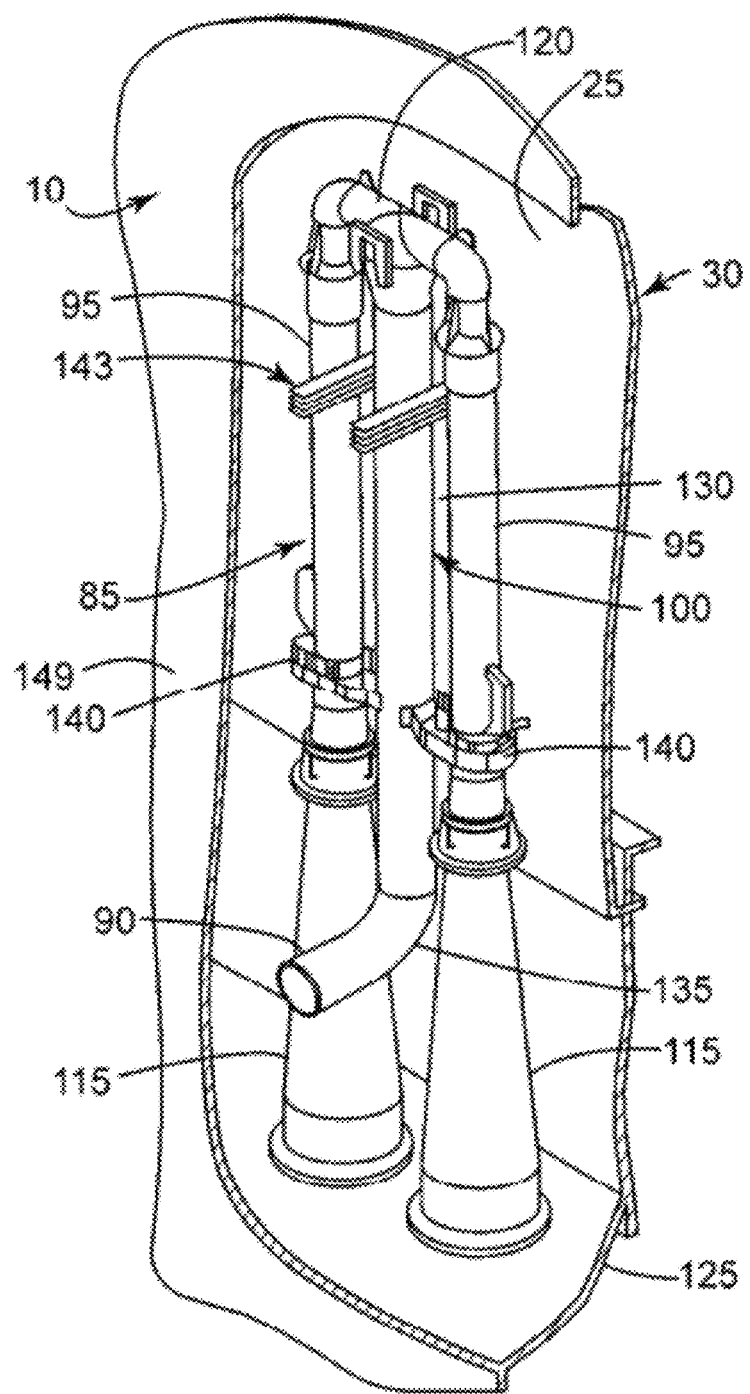
FIG. 2 is a schematic, illustrating the jet pump assembly portion of the boiler water reactor of FIG. 1.
Figure 3:
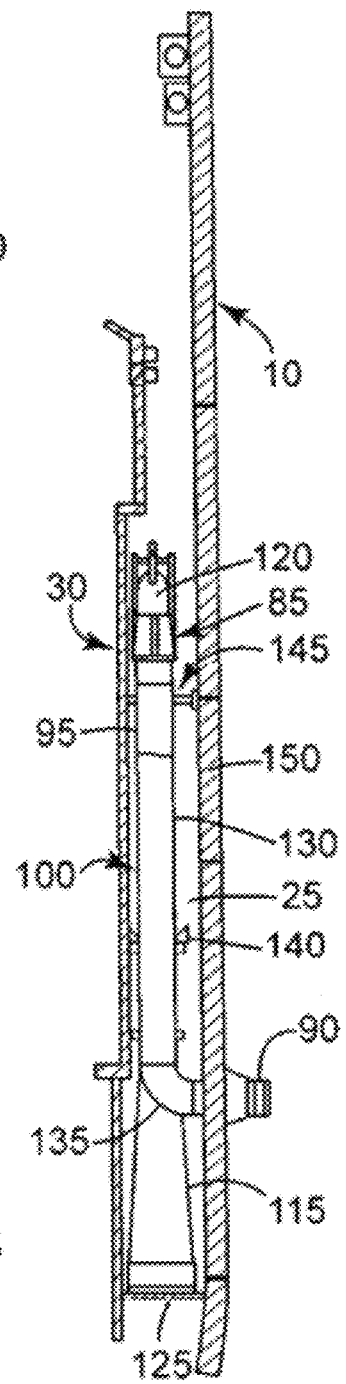
FIG. 3 is a schematic, illustrating a side view of the jet pump assembly of FIG. 2, partially in cross-section.

Referring again to the FIGS where the various numbers represent like parts throughout the several views. FIGS. 2 and 3 are schematics illustrating isometric and side views of a typically jet pump assembly 85 of a RPV 10. FIG. 2 is a schematic, illustrating the jet pump assembly 85 portion of the boiler water reactor of FIG. 1. FIG. 3 is a schematic, illustrating a side view of the jet pump assembly 85 of FIG. 2, partially in cross-section.

As discussed, the jet pump assembly 85 of the RPV 10 is generally disposed in the downcomer annulus 25 located between the RPV 10 and the core shroud 30. Generally, the jet pump assembly 85 comprises: a transition piece 120; an inlet riser 100 extending downwardly from the transition piece 120 to a recirculation inlet 90 along the exterior of a wall of the RPV 10; and a pair of inlet mixers 95 extending downwardly from the transition piece 120 to a pair of diffusers 115 mounted over holes in a pump deck 125, which connects a bottom portion of the core shroud 30 with the RPV 10. The inlet riser 100 generally includes: a tubular riser pipe 130 extending vertically and downwardly within the downcomer annulus 25 in parallel relation to the wall of the core shroud 30; and a tubular riser elbow 135 extending downwardly from the bottom of the inlet riser 100 and bending outwardly toward the recirculation inlet 90. The inlet riser 100 is ordinarily cylindrical and tubular with a longitudinally straight configuration between transition piece 120 and elbow 135. The outer end of the elbow 135 may be connected with a thermal sleeve in the recirculation inlet 90. The transition piece 120 may extend in opposite lateral directions at a top of the inlet riser 100 to connect with the inlet mixers 95 on opposite sides of the inlet riser 100. The inlet mixers 95 are typically oriented vertically in the downcomer annulus 25, in parallel relation to the inlet riser 100. Restrainer brackets 140 may be attached between the inlet mixers 95 and the inlet riser 100; and may provide lateral support for the inlet mixers 95.

A riser brace 143 may support and stabilize the inlet riser 100 in the region of the downcomer annulus 25. The riser brace 143 may integrate the inlet riser 100 with an attachment wall 149 of the RPV 10. An embodiment of the riser brace 143 may generally have a U-shaped configuration. Here, the riser brace 143 may comprise a yoke 145 and first and second side members 147; which may extend in the same direction from opposite ends of the yoke 145 in a spaced parallel relation to terminate at respective side member ends 147. The periphery or footprint of the riser brace 143 may comprise an outer peripheral portion of generally U-shaped configuration, an inner peripheral portion of generally U-shaped configuration within the outer peripheral portion, and end peripheral portions connecting the outer and inner peripheral portions.

An embodiment of the present invention provides a riser brace clamp 150, which serves to connect the inlet riser 100 and the riser brace 143. As illustrated, for example, in FIG. 5 an embodiment of the riser brace clamp 150 may fit around and clamps the riser brace 143 to the inlet riser 100.

FIG. 4 is a schematic illustrating a partially exploded isometric view of an embodiment of a riser brace clamp 150 in accordance with an embodiment of the present invention. Essentially, an embodiment of the riser brace clamp 150 comprises multiple arms. These arms are joined via vertical and horizontal bolts. This arrangement allows for the riser brace clamp 150 to clamp the riser brace 143 to the inlet riser 100 without a need for welding.

As illustrated in FIG. 4, an embodiment of the present invention may comprise the following components: two (2) right clamp arms 155, an upper right and a lower right; and two (2) left clamp arms 185, an upper left, and a lower left; two (2) hinge bolt assemblies, each of which may comprise: a hinge fastener 170, a hinge bolt 175, a seat nut 195, a bushing 200, and a bushing insert 205; and two (2) pinch bolt assemblies, each of which may comprise: a pinch fastener 160, a pinch bolt 180, and a washer 190.

In an embodiment of the present invention, the right clamp arm 155 may be considered a mirror image of the left clamp arm 185 and vice versa. The arms 155,185 may be mounted in two distinct locations on the riser brace 143. The upper arms 155,185 may be mounted on the top surfaces of the riser brace 143, as illustrated in FIG. 5. The lower arms 155,185 may be mounted on the lower surfaces of the riser brace 143, also illustrated in FIG. 5.

As illustrated in FIG. 5, after mounting the arms 155, 185 surround the riser brace 143 and the inlet riser 100. In an embodiment of the present invention, the riser brace clamp 150 may have horizontal and vertical degrees of freedom. The horizontally degree of freedom may be controlled by the pinch bolt assemblies. Here, the pinch bolts 180 may provide a clamping force that draws the right and left clamp arms 155,185 together, respectively. The hinge bolt assemblies may control the vertical degree of freedom. Here, the hinge bolts 175 may provide a clamping force draws the upper and lower clamp arms 155,185 together, respectively.

In an embodiment of the present invention, an end of the clamp arm 155, 185 may comprise a horizontal opening allowing for the pinch bolt 180 to slide through. The opening may take the shape of a hole, slot, or the like. An embodiment of the pinch bolt 180 may comprise a key that may serve as an anti-rotational feature. When assembling the repair brace clamp 150, the key may allow for a user to rotate the pinch fastener 160 without a need to use a tool to hold pinch bolt 180 in a fixed position. The aforementioned opening may comprise a slot for mating with the key of the clamp arm 155,185.

A portion of the horizontal opening may comprise a boss or similar surface located on an external side surface of the clamp arm 155, 185. The boss generally serves to receive a washer 190 of the pinch bolt assembly.

In an embodiment of the present invention, a contact pad 165 for engaging an outer surface of the inlet riser 100 may be provided. The contact pad 165 may be integrated adjacent a rear portion of the horizontal opening, as illustrated, for example, but not limiting of, in FIG. 4.

In an embodiment of the present invention, an opposite end of the clamp arm 155, 185 may comprise a vertical opening allowing for the hinge bolt 175 to slide through. The opening may take the shape of a hole, slot, or the like. The orientation of the vertical opening may be approximately 90 degrees from the orientation of the horizontal opening, as illustrated in FIG. 4.

As discussed, the hinge bolt assembly may comprise: a hinge fastener 170, a seat nut 195, a bushing 200, and a bushing insert 205. The hinge fastener 170 generally secures the vertical degree of freedom of the riser brace clamp 150. A portion of the hinge fastener 170 may comprise a crimp collar, or the like, used to prevent the hinge bolt 175 for loosening during the operation of the RPV 10. A side of the vertical opening may be shaped to mate with a surface of the bushing 200. The bushing insert 205 may serve to locate the hinge bolt 175 within the bushing 200. An external portion of the hinge rod 175 may comprise grooves or slots that allow for mating with an internal portion of bushing insert 205. The grooves or slots may allow for orientating the hinge bolt 175 within the hinge assembly, and more specifically, within the hinge fastener.

FIGS. 5A and 5B, collectively FIG. 5, are schematics illustrating isometric views of a riser brace clamp installed on a riser brace 143 and an inlet riser 100, in accordance with an embodiment of the present invention. Specifically, FIG. 5A illustrates a rear isometric view of the riser brace 143, and FIG. 5B illustrates a front isometric view of the riser brace 143.

FIG. 5A also illustrates how the riser brace 143 may be modified for installing the riser brace clamp 150. In an embodiment of the present invention, the rear portion of the riser brace 143, adjacent the yoke 145, may be modified to allow for the hinge bolts 175 to slide through. This may allow for the riser brace clamp 150 to rigidly secure the vertical degree of freedom against outer surfaces of the riser brace 143.

FIG. 5B illustrates how the clamp arms 155,185 have a shape allowing for the riser brace clamp 150 to nearly surround portions of the inlet riser 100. FIG. 5B also illustrates how the overall size of an embodiment of the riser brace clamp 150 requires a small footprint. This provides the benefit of not consuming additional space after the installation.

The components of an embodiment present invention may be formed of any material capable of withstanding the operating environment to which the riser brace clamp 150 may be exposed.

In use, the riser brace clamp 150 may clamp around the inlet riser 100 and the riser brace 143 at a location of the previous welds. When fully engaged, the riser brace clamp 150 may provide for generous clearance around the inlet riser 100. The riser brace clamp 150 may also reduce the vibration experience by the inlet riser 100.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omissions, additions and equivalents as may be included within the spirit and scope of the invention as defined by the following claims. For example, but not limiting of, an embodiment of the present invention may be used to: a) introduce a different vibration mode; b) to secure a pipe, cable, wire, or other similar object, at a fixed distance away from a separate structure or other object; or c) to apply a compressive load to at least one of the aforementioned objects.

What is claimed is:

1. An apparatus comprising:
    a. a jet pump assembly comprising an inlet riser, wherein the inlet riser comprises a tubular riser pipe that includes a central longitudinal axis;
    b. a riser brace clamp that includes a U-shape form and comprises a yoke and first and second side members that extend transversely from the yoke, wherein the first side member contacts a portion of the inlet riser and the second side member contacts an opposite portion of the inlet riser and the central longitudinal axis is located between the first side member and the second side member;
    c. a riser brace clamp that includes structure sufficient to secure the riser brace to the jet pump assembly, wherein the riser brace clamp comprises:
        i. a first and a second upper clamp arm that comprise surfaces which mount on a top surface of the riser brace, wherein a side surface of the first upper clamp arm is positioned opposite a side surface of the second upper clamp arm, and wherein the side surfaces of the first and the second upper clamp arms engage an outer surface of the inlet riser;
        ii. a first and a second lower clamp arm that comprise surfaces which mount on a bottom surface of the riser brace, wherein a side surface of the first lower clamp arm is positioned opposite a side surface of the second lower clamp arm, and wherein the side surfaces of the first and the second lower clamp arms engage an outer surface of the inlet riser;
        iii. an upper and a lower pinch bolt assembly that horizontally connect the upper and the lower clamp arms; wherein the upper pinch bolt assembly connects the first upper clamp arm with the second upper clamp arm; and wherein the lower pinch bolt assembly connects the first lower clamp arm with the second lower clamp arm; and
        iv. a first and a second hinge bolt assembly that vertically connect the upper and lower clamp arms, wherein the riser brace is positioned between the upper and lower clamp arms after the first and second hinge bolt assemblies vertically connect the upper and lower clamp arms.

2. The apparatus of claim 1, wherein the pinch bolt assembly comprises a pinch bolt and a pinch fastener.

3. The apparatus of claim 2, wherein an outer diameter of the pinch bolt comprises a key.

4. The apparatus of claim 1, wherein each upper clamp arm and each lower clamp arm comprise a pinch bolt opening that allows for the pinch bolt to pass through.

5. The apparatus of claim 4, wherein the pinch bolt opening comprises a slot for mating with the key.

6. The apparatus of claim 4, wherein each hinge bolt assembly comprises a hinge bolt and a hinge fastener.

7. The apparatus of claim 6, wherein a riser brace comprises a hinge bolt opening that allows for each hinge bolt to pass through and allows for the upper clamp arms and the lower clamp arms to secure the riser brace to the inlet riser.

8. The apparatus of 1, further comprising a contact pad that includes an engagement surface which is positioned between a portion of each clamp arm and the inlet riser.

9. The apparatus of claim 8, wherein the pinch bolt opening is horizontally orientated and located at an aft end of the each clamp arm.

10. The apparatus of claim 9, wherein the hinge bolt opening is vertically orientated and located at an opposite end of the pinch bolt opening on each respective clamp arm.

11. A system comprising:
   a. a reactor pressure vessel (RPV) of a nuclear power plant;
   b. a jet pump assembly located with the RPV that comprises an inlet riser, wherein the inlet riser comprises a tubular riser pipe that includes a central longitudinal axis;
   c. a riser brace that includes a U-shape form and comprises a yoke and first and second side members that extend transversely from the yoke, wherein the first side member contacts a portion of the inlet riser and the second side member contacts an opposite portion of the inlet riser and the central longitudinal axis is located between the first side member and the second side member;
   d. a riser brace clamp that includes structure sufficient to secure the riser brace to the jet pump assembly, wherein the riser brace clamp comprises:
      i. a first and a second upper clamp arm that comprise surfaces which mount on a top surface of the riser brace, wherein a side surface of the first upper clamp arm is positioned opposite a side surface of the second upper clamp arm, and wherein the side surfaces of the first and the second upper clamp arms engage an outer surface of the inlet riser;
      ii. a first and a second lower clamp arm that comprise surfaces which mount on a bottom surface of the riser brace, wherein a side surface of the first lower clamp arm is positioned opposite a side surface of the second lower clamp arm, and wherein the side surfaces of the first and the second lower clamp arms engage an outer surface of the inlet riser;
      iii. an upper and a lower pinch bolt assembly that horizontally connect the upper and the lower clamp arms; wherein the upper pinch bolt assembly connects the first upper clamp arm with the second upper clamp arm; and wherein the lower pinch bolt assembly connects the first lower clamp arm with the second lower clamp arm; and
      iv. a first and a second hinge bolt assembly that vertically connect the upper and lower clamp arms, wherein the riser brace is positioned between the upper and lower clamp arms after the first and second hinge bolt assemblies vertically connect the upper and lower clamp arms.

12. The system of claim 11, wherein the pinch bolt assembly comprises a pinch bolt and a pinch fastener.

13. The system of claim 12, wherein an outer diameter of the pinch bolt comprises a key.

14. The system of claim 11, wherein each upper clamp arm and each lower clamp arm comprise a pinch bolt opening that allows for the pinch bolt to slide through.

15. The system of claim 14, wherein the pinch bolt opening comprises a slot for mating with the key.

16. The system of claim 14, wherein the each hinge bolt assembly comprises a hinge bolt and a hinge fastener.

17. The system of claim 16, wherein a riser brace comprises a hinge bolt opening that allows for each hinge bolt to slide through and allows for the upper clamp arms and the lower clamp arms to secure the riser brace to the inlet riser.

18. The system of 11, further comprising:
   a contact pad that includes an engagement surface which is positioned between a portion of each clamp arm and the inlet riser.

19. The system of claim 18, wherein the pinch bolt opening is horizontally orientated and located at an aft end of the each clamp arm.

20. The system of claim 19, wherein the hinge bolt opening is vertically orientated and located at an opposite end of the pinch bolt opening on each respective clamp arm.

* * * * *